(12) United States Patent
Hester (10) Patent No.: US 8,537,812 B2
(45) Date of Patent: *Sep. 17, 2013

(54) ENABLING QUALITY VOICE COMMUNICATIONS FROM WEB PAGE CALL CONTROL

(75) Inventor: Rex Hester, Bear Creek, NC (US)

(73) Assignee: Infinet Global Communications, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/411,388

(22) Filed: Mar. 2, 2012

(65) Prior Publication Data

US 2012/0236844 A1    Sep. 20, 2012

Related U.S. Application Data

(63) Continuation of application No. 11/196,042, filed on Aug. 3, 2005, now Pat. No. 8,130,750, which is a continuation of application No. 09/411,663, filed on Oct. 4, 1999, now Pat. No. 6,973,091.

(51) Int. Cl.
*H04L 12/66* (2006.01)

(52) U.S. Cl.
USPC ............................ 370/352; 370/389; 370/401

(58) Field of Classification Search
None
See application file for complete search history.

(56) References Cited

U.S. PATENT DOCUMENTS

| | | | |
|---|---|---|---|
| 4,782,485 A | 11/1988 | Gollub | |
| 4,888,822 A | 12/1989 | Weinberger et al. | |
| 5,425,085 A | 6/1995 | Weinberger et al. | |
| 5,519,769 A | 5/1996 | Weinberger et al. | |
| 5,687,220 A | 11/1997 | Finnigan | |
| 5,715,305 A * | 2/1998 | Penzias et al. | 379/221.02 |
| D398,298 S | 9/1998 | Giordano, III | |
| 5,889,774 A | 3/1999 | Mirashrafi et al. | |
| D411,534 S | 6/1999 | Lepack et al. | |
| 5,991,394 A | 11/1999 | Dezonno et al. | |
| 6,012,102 A | 1/2000 | Shachar | |
| 6,026,087 A | 2/2000 | Mirashrafi et al. | |
| 6,067,546 A * | 5/2000 | Lund | 1/1 |
| 6,091,808 A | 7/2000 | Wood et al. | |
| 6,104,711 A | 8/2000 | Voit | |
| 6,141,341 A | 10/2000 | Jones et al. | |
| 6,144,670 A | 11/2000 | Sponaugle et al. | |
| 6,173,043 B1 | 1/2001 | Finnigan | |
| 6,185,194 B1 | 2/2001 | Musk et al. | |
| 6,282,284 B1 | 8/2001 | Dezonno et al. | |
| 6,282,574 B1 | 8/2001 | Voit | |
| 6,295,551 B1 | 9/2001 | Roberts et al. | |

(Continued)

OTHER PUBLICATIONS

Trillium, H.323 Tutorial pp. 1-3, 6&8; http://whitepapers.zdnet.co.uk/0,39025945,60003813p=39000445q.00.htm and www.cse.wustl.edu/~jain/cis788-99/ftp/h323, as cited on Sep. 15, 2005.

(Continued)

*Primary Examiner* — Robert Wilson
(74) *Attorney, Agent, or Firm* — The Webb Law Firm (57) ABSTRACT

A system and method of bypassing the regulated portion of the Public Switching Telephone Network (PSTN) to establish carrier-grade voice transmissions and/or IP data communications between an Internet Calling Person having a first telephone and a first PC coupled to a first Local Service Access Provider (LSAP) and an Internet Called Party having a second telephone and a second PC coupled to a second different Local Service Access Provider (LSAP).

69 Claims, 4 Drawing Sheets

(56) References Cited

U.S. PATENT DOCUMENTS

| | | | |
|---|---|---|---|
| 6,337,858 B1 * | 1/2002 | Petty et al. ............... 370/356 |
| 6,359,880 B1 | 3/2002 | Curry et al. |
| 6,377,573 B1 | 4/2002 | Shaffer et al. |
| 6,377,944 B1 | 4/2002 | Busey et al. |
| 6,393,015 B1 | 5/2002 | Shtivelman |
| 6,404,764 B1 | 6/2002 | Jones et al. |
| 6,408,068 B1 | 6/2002 | Larson et al. |
| 6,430,176 B1 * | 8/2002 | Christie, IV ............... 370/355 |
| 6,445,695 B1 | 9/2002 | Christie, IV |
| 6,463,053 B1 | 10/2002 | Chen |
| 6,493,349 B1 * | 12/2002 | Casey ........................ 370/409 |
| 6,501,837 B1 | 12/2002 | Adler et al. |
| 6,519,628 B1 | 2/2003 | Locascio |
| 6,526,042 B1 | 2/2003 | Pinard et al. |
| 6,570,870 B1 | 5/2003 | Berstis |
| 6,614,774 B1 * | 9/2003 | Wang ......................... 370/338 |
| 6,614,781 B1 | 9/2003 | Elliott et al. |
| 6,621,899 B2 | 9/2003 | Dezonno et al. |
| 6,687,241 B1 | 2/2004 | Goss |
| 6,690,672 B1 | 2/2004 | Klein |
| 6,697,459 B2 | 2/2004 | Finnigan |
| 6,754,693 B1 | 6/2004 | Roberts et al. |
| 6,760,324 B1 | 7/2004 | Scott et al. |
| 6,791,974 B1 | 9/2004 | Greenberg |
| 6,845,102 B1 | 1/2005 | Bendelac et al. |
| 6,865,540 B1 | 3/2005 | Faber et al. |
| 6,937,699 B1 | 8/2005 | Schuster et al. |
| 6,973,091 B1 * | 12/2005 | Hester ........................ 370/401 |
| 7,124,165 B1 | 10/2006 | Barraclough et al. |
| 8,130,750 B2 * | 3/2012 | Hester ........................ 370/352 |
| 2002/0067739 A1 * | 6/2002 | Wilkes et al. ............... 370/465 |

OTHER PUBLICATIONS

Chakrabatri, et al., "Hypersearching the Web" Scientific American, Jun. 1999, vol. 280, pp. 54-60.

* cited by examiner

ENABLING QUALITY VOICE COMMUNICATIONS FROM WEB PAGE CALL CONTROL

This Application is a continuation of U.S. patent application Ser. No. 11/196,042 (U.S. Pat. No. 8,130,750), filed Aug. 3, 2005, which is a continuation of U.S. patent application Ser. No. 09/411,663 (U.S. Pat. No. 6,973,091), filed Oct. 4, 1999, in the name of Rex R. Hester for "Enabling Quality Voice Communications From Web Page Call Control," both of which are hereby incorporated by reference in their entirety for all purposes as if fully set forth herein.

BACKGROUND OF THE INVENTION

1. Field of the Invention

The present invention relates in general to the ubiquity of the Internet Web Page for information and the ubiquity of the telephone and its associated number for quality voice communications and in particular a method of converging these two entities with a capability of connecting a Web Page user (Calling Party) and the Called Party (Web Page advertiser or single party subscriber) via a Managed Voice-over-Internet Protocol Network (MVoIP) that provides carrier-grade voice quality, and performance equal to the existing Public Switched Telephone Network (PSTN).

The present invention also relates to the capability of holding call requests to business customers in a "cyber queue" until such time a business representative (agent) can answer the call. The present invention further provides for Web Page navigational procedures that present value-added information to the business representative thereby reducing business representative work time when a form is completed by the Web Page user and forwarded to the business representative via the proposed invention method. The present invention further provides for "web enabling" an entire company's Web Page, not just the company's Call Center. This relates to the capability of placing a call to any name, number, symbol, etc., located on a Web Page.

2. DESCRIPTION OF RELATED ART INCLUDING INFORMATION DISCLOSED UNDER 37 CFR 1.97 AND 1.98

Acronyms used herein are identified as follows:

| | |
|---|---|
| CPE | Customer Premise Equipment |
| FCC | Federal Communications Commission |
| IP | Internet Protocol |
| ISP | Internet Service Provider |
| LSAP | Local Service Access Provider |
| MIPN | Managed Internet Protocol Network |
| MVoIP | Managed Voice-over-Internet Protocol |
| PBX | Private Branch Exchange |
| PSTN | Public Switching Telephone Network |
| PUC | Public Utilities Commission |
| SS7 | Signaling System #7 Network |
| VoIP | Voice-over-Internet Protocol |

The Internet has brought about many exciting communications capabilities for consumers. There are, however, needs and solutions for consumers (on-line Web Page users/surfers) to have collaborative communications, voice and/or data interaction with a business or its service Customer Premise Equipment (CPE) by utilizing information derived while browsing a Web Page. Customer Premise Equipment (CPE) is defined herein as equipment located at customer location (Calling or Called Party) which provides quality voice and voice and/or data capability for the user. Examples of these devices include, but are not limited to, telephones, personal computers (PC), multimedia PC, multimedia cable television, cellular phones, Call Center equipment, etc. A "Call Center" is defined herein as Customer Premise Equipment (CPE) where agents (more than one agent) both receive and provide bidirectional voice and/or Internet Protocol (IP) data between a Calling Person and a Called Party (an advertiser's agent).

The Called Party may be a Web Page Internet advertiser, in which case the advertiser service Call Center is coupled to a Local Service Access Provider (LSAP) for transmission of voice and/or voice and data to the Web Page user (Calling Party). An LSAP (Local Service Access Provider) is defined herein as a telephone system that couples all of the CPE in a local area to each other internally and to external systems such as the PSTN. The LSAP provides local access to all of its coupled CPE customers. No toll charges apply on calls between these CPE customers connected to the same LSAP. Toll charges apply on calls connected from an LSAP to the PSTN which switches these calls to another LSAP. For purposes of discussion within this application, the PSTN is defined herein as that part of the government regulated telephone network that couples one LSAP with another different LSAP.

Toll-free 1-800 calling is an example of calls made over the existing PSTN by telephone users. For example, calls made to an airlines using the traditional 1-800 calling services are routed over the PSTN. This network is regulated by both federal (FCC) and state (PUC) government regulatory bodies. These regulations have added access charges, interstate, intrastate, and 800 settlement charges, to name a few costs associated therewith.

Currently without the use of the Internet callers dial a toll-free 800 number and the charges are billed to the 1-800 business customer and not to the Calling Party. Thus, the routing of such call is via the regulated PSTN. When the call arrives at a typical service CPE Call Center, numerous directory menus and voice prompts delay the actual conversation with an agent. This, of course, creates aggravation for the Calling Party. Further, billing charges for the call to the advertiser (Called Party) starts at the beginning of receipt of the automated directory and prompts (answer), not the actual voice conversation with the Called Party agent.

This implementation does not allow for implementation of call handling functionality in the network to reduce costs and/or provide caller convenience. The government regulations present telephone network planners with very little room for design when attempting to be competitive. The present PSTN is also difficult to adapt to new, evolving technology such as the Internet Protocols (IP).

Figure 1:
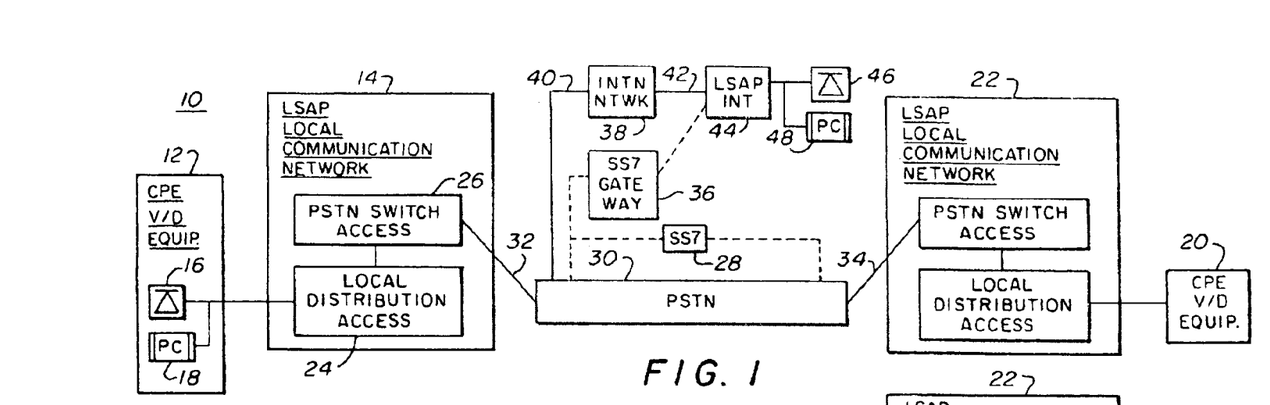
FIG. 1 is a schematic diagram of the prior art Public Switching Telephone Network that enables a call such as a 1-800 call to be made between a Calling Party and a service Call Center.

Thus, today, when anyone calls 1-800-ANY-AIRLINE from a telephone 16, from a system 10 such as shown in FIG. 1, the telephone 16 is a part of a Customer Premise Equipment area 12. For purposes of explanation in the application, the CPE area 12 will be designated as the "Calling Party". The call from the Calling Party is routed through the local access distribution circuit 24 to the PSTN 30 and then to the airline CPE Call Center 20 where agents reside to answer service or sales calls. The first event that occurs, when the Call Center system 20 identifies a new call, is that an automated attendant answers the caller. Then, by using a set of directory menus and voice prompts, the automated attendant attempts to identify the service need or needs for routing the call to a specialized agent. The following voice prompts are typical:

"Press (1) If you need arrival or departure information"

"Press (2) if you need reservations within the United States",
"Press (3) if you need reservations for international flights",
"Press (4) if you need assistance for any airline vacation planning"
"Press (5) for all other inquiries",
"Press (6) to hear the prompts again".

These prompts may take up to 35 seconds or more. After one has chosen to make a reservation and pressed (2), the call is placed in a queue and the next available, specialized agent will be given that call to answer. This queue timing is dependent on the number of agents available and how busy they are at the time the incoming call is received. Thus, the queue timing may range anywhere from five seconds to several minutes or longer. For purposes of the present explanation, a queue time of 15 seconds will be used. As identified in this example, the prompts may be listened to for 35 seconds and the queue time for waiting for an agent is 15 seconds. This represents a total of 50 seconds or more of billing time to any the business customer before the Calling Party starts actual conversation with an agent. During this time costly switch ports and voice circuit facilities are also being used prior to actual dialogue with an advertiser's agent (Called Party).

At this point, a discovery dialogue starts as to when the Calling Person wants to travel, how many people will be traveling, the frequent flier number, the return dates, preferences and the like, and, of course, the credit card number. This process takes approximately 15 minutes.

Thus, as seen in FIG. 1, the 1-800 Calling Person 12 has a telephone 16 that is coupled to an LSAP switch 14. The Calling Person also may have a Web Page user PC 18 coupled to the telephone lines 32 through the LSAP switch 14. When the 1-800 number is dialed, the Signaling System #7 Network 28 (SS7—a system well known in the communications industry) sets up the call from the PSTN switch access 26 portion of LSAP 14 to LSAP 22 which has coupled to it the service provider's CPE with Call Center 20. Voice connections are made through the regulated PSTN 30 and associated telephone lines 32 and 34. Thereafter, the automated attendant responds with options to the Calling Person 12, who can then make the choices as described earlier through the PSTN In addition, the 1-800 call could be made through the international telephone network 38 when set up by the SS7 gateway 36, and the telephone calls are then routed over telephone lines 40 and 42 to the international Local Service Access Provider (LSAP) 44 and the Called Party telephone 46. Of course, the Called Party 46 may also have a personal computer 48.

The Internet is frequently used to browse over the Web Pages to find a particular product or desired service having an associated 1-800 number and the Web Page user can, by using his telephone, then call the 1-800 number over the PSTN as described earlier.

Figure 2:
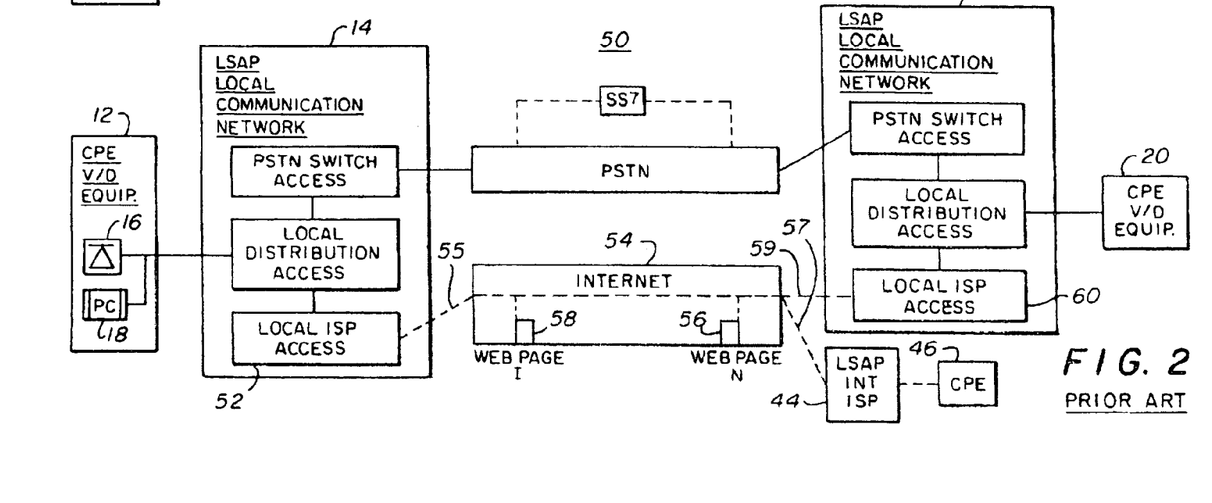
FIG. 2 is a schematic circuit diagram of the prior art Public Switching Telephone Network in FIG. 1 with the Internet added to it to enable Internet phone calls to be made between a Calling Party and a service Call Center.

Thus, as shown in FIG. 2, the Calling Person 12 may use his personal computer 18 that is coupled through LSAP 14 to a local Internet Service Provider (ISP) access 52 and line 55 to the Internet network 54. There, the Calling Party (Web Page user) may browse the Web Pages that are provided by a Web server 58 until a desired product or service is located. When such desired product/service is located, formal voice communications may be required, clearing up open-ended issues such as specific color or size in stock, special pricing or fares, credit card security, perceptions, product questions and comparisons, and the like. In the majority of cases, customers close the transaction only after some formal voice communication.

FIG. 2 is a diagram of the prior art system 50 in which the Internet is used to complete such business transaction. Thus, when the Internet user logs onto the Internet, a dial-up connection is used through the LSAP 14 and Local ISP access 52 to access the Internet network 54. After the proper connection is made to the Internet network 54 on line 55, the user may browse the Internet to locate product information or services desired. Web information is stored on Web Pages located in Web servers 56 and 58, connected to the Internet 54. Once the consumer has determined the product or services in which there is interest, the Web Page, containing a well-known "call me" capability permits the consumer to have follow-up voice and/or IP data communications using the existing Internet network and/or the PSTN.

Existing art "call me" capability will use two different methods of voice communications with the Web user. The first requires the implementation of first equipment (PC) that interfaces the Internet and second equipment (a telephone) that has direct connections to the PSTN. From that point on, i.e., when the telephone is used, the call is a typical PSTN call with all the problems of cost and inconvenience to the Calling Party. This implementation actually requires two PSTN calls to be made: a device (server computer) in the PSTN places a call to the phone number of the Web Page user (Calling Party) over the PSTN and also places a call to the Calling Party This doubles the communication cost to the business just to get the Web Page user to communicate person-to-person with the business. If the Web Page user (browser) has two telephones, he may use one of the phones to call the 800 toll-free number through the PSTN as described previously while the PC remains coupled to the Internet to receive IP data. If the Web Page user has only one phone line and is connected through it to the Internet, the user can either disconnect from the Internet and place the call on the 1-800 call through the normal PSTN, or can place the 1-800 call to the service Call Center 20 using the "call me" capability on the Web Page. The connection will be made through Internet connection 59 from the Internet network 54 to the local ISP access 60 in LSAP switch 22. The CPE equipment in this case the Call Center agents equipment 20, must be Voice-over-Internet Protocol compatible and enabled. The CPE equipment at the Calling Party CPE 12 must also be Voice-over-Internet Protocol compatible and enabled.

If the call is placed over the PSTN, the call is generally noted as a "cold call" and is similar to any 1-800 call to a business or business Call Center described earlier. This type of call requires voice prompts and queue times that, as stated previously, adds costs to the long distance telephone bill and uses expensive switch ports and facilities. If this call is made using the "call me" capability of existing art, and Voice-over-Internet Protocol is used over the existing Internet, the voice quality, network reliability, and performance of the existing Internet networks become a major problem for true quality business applications. Call delivery, latency, and delay all play an important factor in quality voice service. The Internet was designed and implemented to deliver data application to the masses, not to deliver quality voice to business applications.

As can be seen in FIG. 2, in the prior art, the Internet 54 could also place a call on line 57 to an international LSAP using its ISP local access 44 which has coupled to it CPE 46 which may include a telephone coupled to a PC or advertiser's call agents connected to a Call Center.

The problems associated with prior art utilizing calls over the PSTN are many.

First, the cost of delivery of 800-type traffic over the existing regulated PSTN is very capital intensive. Thus customers must absorb these costs plus the profit added by the carrier, whether the bill is being paid by the Calling Party or the Called Party. Every PSTN call requires capital expenditures in switch ports throughout the network. Every connection to a switch port requires capital or lease expense in physical voice facilities. All of this equipment requires floor space, power, maintenance etc. on an ongoing basis.

Second, the PSTN does not allow for queuing in the network to allow the 800 business customers (Called Party) to save on calls while awaiting answer by the Called Party agent.

The existing method of calling over the PSTN does not deliver an informed customer to the advertiser's CPE. Present art only allows a customer to be prescreened to the effect of the voice prompts made available to the Calling Party.

The problems associated with calls made over the Internet with the prior art are also numerous.

Present state-of-the-art requires that the Web Page user have a PC capable of supporting compatible Voice-over-Internet Protocols such as H-323 standards. Not all Web Page users have microphones, speakers, and the software available on their PC to support this prior art, thus it is not ubiquitous. Most businesses do not provide multi-media PCs to their employees. However, almost all employees have telephones and computers with Internet access. The present Internet has no guaranteed delivery of service end-to-end because present Internet networks are designed to be data networks not voice and data networks. Also, voice quality, as presently exists on the Internet, is far too inferior and unpredictable for any type of business application which requires communications between the Web Page user and the Web Page advertiser. Business customers expect the same quality of voice and reliability as is presently available over the PSTN. Further, the prior art system does not allow for total utilization of Internet Protocol (IP) technology such as queuing Web Page users in "cyber space" while waiting for an available advertiser agent to become available. Prior art implementation in some cases connects the Web Page user with the advertiser agent by placing calls through the PSTN which provides the same problems as previously described in prior art with calls on the PSTN. In addition, the prior art does not allow for coordination between the Web Page and CPE Call Center procedures. With the prior art there is clearly no ubiquity in service due to not all the CPE of Calling Parties having multimedia capability, i.e. microphones, speaker, Voice-over-IP software compatibility. In addition, prior art implementations allow access to advertiser agents through use of chat, e-mail, etc. which do not solve the cultural issues such as the need to have personal voice contact when completing a transaction. Existing art is based on the concept of callback for voice communications. This is because the prior art is based on an implementation where the agent gets the Web user's information such as telephone number, from the chat session, the e-mail received, or the information received on a Web-enabled agent screen. The agent then places a call to the Calling Party, thus the "callback" scenario. This creates problems in coordinating the callback with the availability of the Calling Party. This method of implementation does not allow for instant buying by the Calling Party.

A big disadvantage to prior art callback scenarios is that it does not allow calls to be made to an individual single phone number other than over the PSTN.

Prior art "call me" capability only allows calls to agents that can call back if a quality voice connection is required. Remember, in the prior art the agent receives the information over the Internet via chat requests or e-mail. The problems with voice connections over the Internet have been discussed earlier.

Other problems with prior art includes the situation with Web Page users (Calling Party) searching the Web and finding a site which displays only a 1-800 number to call for voice communications. The international dialing plan does not allow the 800 number to be dialed from an international location. The cost of dialing internationally also prohibits commerce in these situations. Also, the present state of the art does not allow phone conversation to be established from any Web Page user anywhere in the world to any number, symbol, or name on a Web Page anywhere else in the world in a simple, reliable manner by a simple "click" of the mouse on the Web Page user's PC.

A summary of the operation of the prior art Internet service is as follows. The Calling Party goes off-hook with his telephone connected to the LSAP. The LSAP returns a dial-tone (ready-to-receive digits). The Calling Party (Web Page user) then enters the Internet Service Provider's access digits. The user logs onto the Internet and selects a company Web Page. The user then wants to verify the product or service and complete the transaction. The company access number (typically, 1+800) is obtained from the Web Page and the Web Page user either hangs up (to clear the telephone line) and dials the service Call Center on the 1+800 number, or uses a second line to call the company's service Call Center 1+800 number.

If the user has to hang up to complete the call, he disconnects his PC from the Internet after having obtained the 1+800 access number and then goes off-hook again towards the LSAP. The LSAP returns a dial-tone (ready-to-receive digits) and the user then enters the 1-800 number for the desired service Call Center. If the PSTN is used, then the call is completed as described earlier.

If the Web Page user desires to make a call through the Internet network 54 the instructions on the Web Page are followed and the connection is made from the user PC through the ISP network 54. Again, the voice quality is very poor, the service is not guaranteed, and the Calling Party PC and the called party CPE must be Voice-over-IP compatible. As stated earlier this is not a ubiquitous offering.

Since the federal government has ruled that the IP networks will not be regulated in the same manner as the present PSTN system, a tremendous opportunity exists for innovative solutions that deal with today's communications costs and inherent issues.

Thus, it would be advantageous to have a methodology and solution to eliminate voice prompts and the costs that are charged prior to answer by an agent with the use of Web Page navigation and selection. Further, it would be advantageous to have ubiquitous access to any CPE on any LSAP with a MVoIP methodology and implementation. This MVoIP must be of same carrier-grade voice quality of the PSTN so that major business customer could offer this calling service to their customers. It would also be advantageous to have the capability of calling any number, name, or symbol from a Web Page over the MVoIP network.

SUMMARY OF THE INVENTION

The present invention enables the Calling Person (user), through Web Page navigation, to make selections of products and/or services advertised on the Internet and to provide detailed information to the Internet system concerning such selections along with a customer profile. The invention provides for informed Web Page users to communicate with an agent by forwarding the data completed by the Web Page user (Calling Party) to the agent at time of answer by the agent. This data can include such information as name, address, phone number, age, language preference, and other product-related information as requested though Web Page navigation custom-made for the particular customer business. This reduces agent work time, conversation time, and produces a satisfied and content customer (Calling Party). Web Page design and navigation can provide all the data needed by the agent to complete the transaction. This capability is not available over the existing PSTN. The novel system allows the call of a Calling Person to automatically navigate through any "prompts", identify the information required to purchase the produce/service such as flight information, flight number, number of people traveling, preferred seating, international or domestic flight preference, Advantage card numbers, billing information, color, size, and the like, and thus, delivers an informed customer to the agent of the Web Page advertiser (Called Party).

The invention also allows "call me" capability from any number associated with a Web Page, whether it be to a Call Center or to a single telephone. For example, a business may offer a Web Page that contains a "call me" capability to their Call Center for product purchases or service while at the same time has phone numbers associated with a receptionist or an individual.

This new novel invention allows phone conversation to be established from any Web Page user anywhere in the world to any number, symbol, or name on a Web Page anywhere else in the world in a simple, reliable manner by a simple "click" of the mouse on the Web Page user's PC.

The novel invention allows calls to be queued in the Managed Voice-over-Internet Protocol (MVoIP) network prior to being answered by an agent. The new art method requires no switch port access or facility cost on the PSTN. All voice connections to and from the Web Page user and the advertiser agent is though the LSAP and MVoIP network, thus eliminating the PSTN costs while utilizing the unregulated IP network.

With the use of a Web Page that simulates calls providing menus, prompts and procedures, a wealth of information is provided to the advertiser Call Center without the Calling Person being required to utilize multi-layering voice prompts that lack sufficient information and often require users to listen through all layers. By incorporating the uniqueness of the IP, "look ahead" searching for idle telephone lines of agents is available before routing the call into the advertiser network and/or Call Center. Advantageously, the present system eliminates the need to route through the PSTN, but provides a level of access and operability comparable to the PSTN that can eliminate long-distance costs and provide carrier-grade voice quality between the Calling Person and the Called Party.

The keys to utilization of Voice-over-IP technology for business applications is the ease of use, the management of the VoIP network, and the ubiquity of the service. It is important to understand that anyone with Internet access can browse any Web Page; thus, any Web Page user can click on a "call me" button in an attempt to communicate with a business agent. Thus ubiquity in service and application is very important.

Every Web Page user has a telephone and thus, this new art utilizes the ubiquity of the telephone along with the deployment of a Managed Voice-over-Internet Protocol network (MVoIP) to deliver quality voice from Web Page users to an advertiser's CPE.

This invention allows for total coordination between Web Page navigation and the CPE at the Called Party (advertisers) location such that all the data on the Web Page which has been filled out by the Calling Party will be used to place the call to the proper location and agent. This data will also inform the agent so that less dialogue and time will be required to complete the transaction.

The invention also allows "call me" capability from any number associated with a Web Page, whether it be to a Call Center or to a single telephone. For example, a business may offer a Web Page that contains a "call me" capability to their Call Center for product purchases or service while at the same time has phone numbers associated with a receptionist or an individual.

With this invention, calls to a single telephone are still switched over the 20 MVoIP network to reduce cost and to allow quality voice communication from Web Page browsing. This allows small business to have quality voice conversation with interested Web Page users without having to purchase and advertise an 800 number on their Web Page.

This also allows a Web Page user to click on a Web Page equipped with "call me" capability and a call will be placed to the advertiser's agent without the use of 800 numbers. The call will cost significantly less due to the use of a MVoIP network connecting the LSAPs internationally with the LSAP of the advertiser (Called Party).

It is therefore an object of the present invention to provide a system and method to eliminate voice prompts and the costs that are charged prior to answer by an agent at a service Call Center with the use of Web Page navigation to make choice selections.

It is also an object of the present invention to provide an Internet user (Calling Party) with PSTN carrier-grade voice quality and customer IP data interaction connections to service Call Centers utilizing Web-based navigational procedures.

It is also an object of the present invention to reduce network voice link holding times and usage costs through enhanced IP network queuing procedures.

It is still another object of the present invention to reduce service Call Center workforce requirements (telephone answering agents) through implementing Web-based navigational procedures and providing this data to the called agent (Called Party).

It is yet another object of the present invention to fully utilize the capability of IP telephony for purposes of IP data collaboration between an Internet user (Calling Person) and a service or product advertiser/provider (Called Party).

It is another object of the present invention is to provide carrier-grade voice quality communications over connections that bypass the PSTN and that are established by means of the Internet Protocol (IP).

It is also an object of the present invention to provide new services to the Internet user (Calling Person) and Web Page advertisers (Called Party) over a proposed Managed Voice-over-IP (MVoIP), including automatic access to an IP Called Party whose name is in the telephone white pages stored on the Internet, the ability to select and call an e-mail name (Called Party) simply by clicking on the name included in the e-mail using carrier-grade voice quality connections at a lower cost, and providing IP 1-800 attributes and features that rival the regulated and costly PSTN.

It is yet another object of the present invention to provide a system in which both voice and/or IP data is carried over non-regulated, Managed Voice-over IP networks.

It is still another object of the present invention to extend managed IP network features to the international market by creating prompt and immediate connectivity from an international Web Page user to the Web Page advertiser business via the MVoIP and using Web Page navigational procedures.

Another important object of the present invention is to enhance network call queuing to Web surfers by providing the "call queuing" within the network to reduce call and network connection hold times and to establish network connections (voice and IP data) with the agent only when the agent is available. This invention will save business customers the toll call costs associated with voice prompt time and the time it now takes for calls to be held while waiting for an agent to become available and the associated equipment cost and facility costs to support these additional hold times.

It is yet another important object of the present invention to provide a method of bypassing the Public Switching Telephone Network (PSTN) to establish voice communications between an Internet Web Page user (Calling Person) having a telephone coupled to a first Local Service Access Provider (LSAP) and an Internet Web advertiser (Called Party) having a telephone coupled to a second Local Service Access Provider (LSAP).

Thus, the present invention relates to a method of bypassing the Public Switching Telephone Network (PSTN) to establish voice communications between an Internet Web Page user (Calling Person) having a telephone coupled to a first Local Service Access Provider (LSAP) and an Internet Web advertiser (Called Party) having a telephone coupled to a second Local Service Access Provider (LSAP) comprising the steps of establishing a Managed Voice-over-Internet Protocol (MVoIP) network that is capable of bidirectional transmission of both voice and Internet Protocol data communications; browsing the Internet with a Web Page user CPE to locate an Internet advertised product/service having an associated telephone number; and accessing the advertiser telephone number with the Web Page user CPE to cause the MVoIP to automatically establish at least voice communications, and preferably both voice and Internet Protocol data communications, between the associated telephone number of the advertiser of the located products/services and the Web Page user calling number through the Web Page user LSAP and the local advertiser LSAP CPE Call Center.

The invention also relates to a method of completing a telephone call between a Web Page user Calling Party having a first telephone and a personal computer (PC) coupled to a first Local Service Access Provider (LSAP) and an Internet Called Party having a second telephone coupled to a second Local Service Access Provider (LSAP) comprising the steps of bypassing the existing Public Switching Telephone Network (PSTN) with a Managed Voice-over-Internet Protocol (MVoIP) telephone system having carrier-grade voice quality and being coupled between the Calling Person LSAP and the Called Party LSAP, such that a telephone conversation can take place between the Calling Person and the Called Party; locating the name of the Called Party on the Internet with the Calling Person CPE PC; selecting the name of the Called Party from an Internet site using a PC cursor control (a "mouse") coupled to the Calling Person PC; and automatically enabling said MVoIP system to establish a voice connection between said Calling Person and said Called Party that bypasses the regulated portion of the PSTN when the name of the Called Party is selected.

The invention also relates to a system for completing a telephone call between a Web Page user Calling Party having CPE such as a telephone and a PC coupled to a Local Service Access Provider (LSAP) and an advertiser of a product/service on a Web Page having a telephone coupled to an advertiser Call Center comprising a Managed Voice-over-Internet Protocol (MVoIP) telephone system capable of being coupled between the Internet Web Page user LSAP and the advertiser LSAP CPE Call Center such that a voice telephone conversation can take place between the Web Page user and the advertiser; a product/service of interest to the Web Page user being located on the Web Page and selected for review with the Web Page user PC; a telephone number associated with the product/service of interest; and connection means between the Internet and the MVoIP for enabling the MVoIP system to automatically establish voice connections between the Web Page user and the product/service advertiser Call Center upon selection of the advertiser telephone number associated with the product/service by the Web Page user.

BRIEF DESCRIPTION OF THE DRAWINGS

These and other features of the present invention will be more fully disclosed when taken in conjunction with the following Detailed Description of the Invention in which like numerals represent like elements and in which.

DETAILED DESCRIPTION OF THE INVENTION

Figure 3:
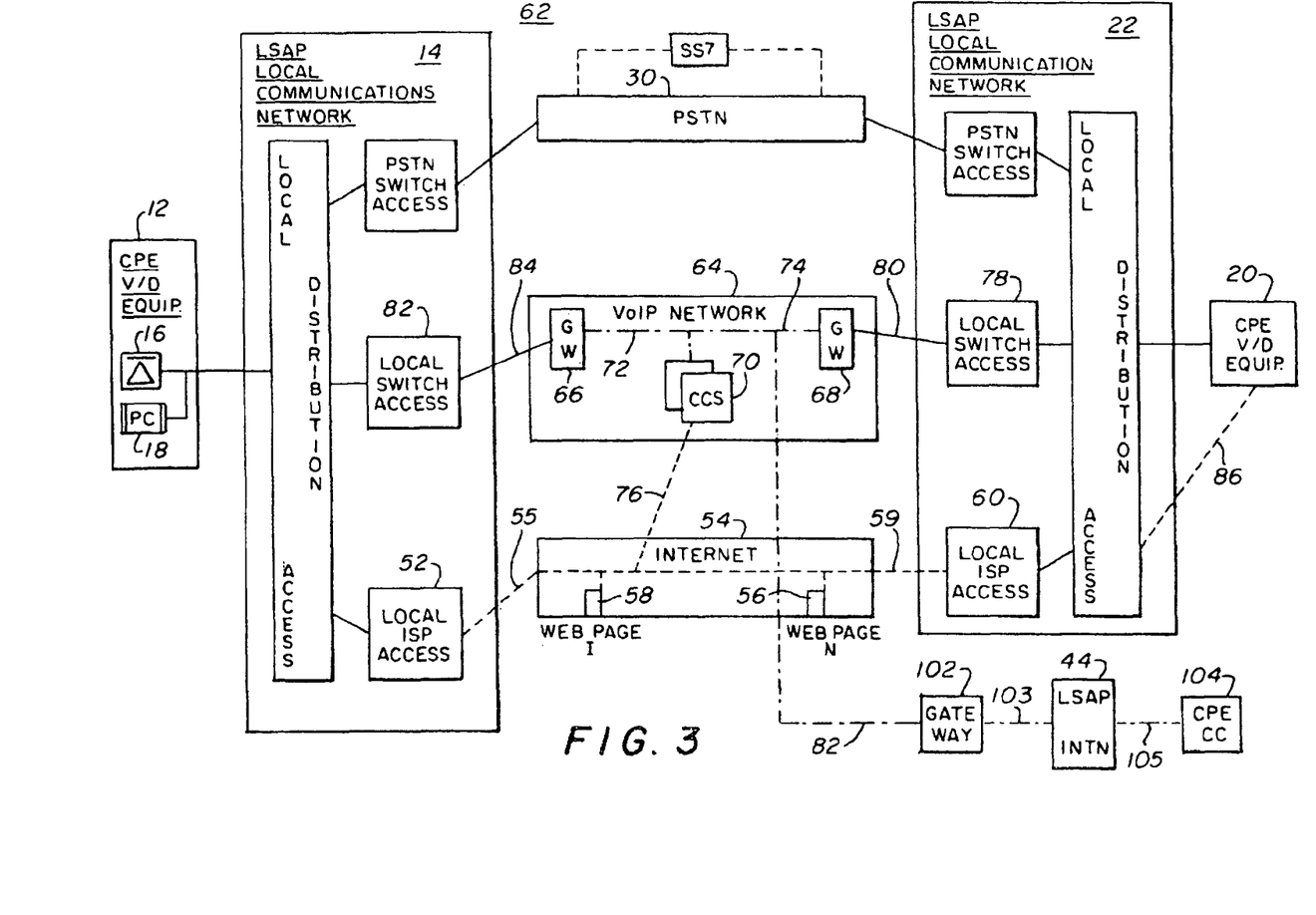
FIG. 3 is a schematic representation of the Public Switching Telephone Network and the Internet system modified by a Managed Voice-over-Internet Protocol (MVoIP) of the present invention.

FIG. 3 is a schematic block diagram of the present invention utilizing the Internet and the novel VoIP network to bypass the PSTN.

The novel system 62 of FIG. 3 includes not only the Public Switching Telephone Network (PSTN) 30 and its associated operating elements, but also the Internet 54 and its associated elements coupled to a Managed Voice-over-Internet Protocol network (MVoIP) 64. The MVoIP network 64 includes a first gateway 66 that couples both voice and IP data between the first LSAP 14 and second LSAP 22 coupled to the Call Center 20. It also includes a second gateway 68 that couples both voice and IP data on line 80 to second LSAP 22 coupled to Call Center 20. International gateway 102 is also coupled to the MVoIP network on line 82. The international gateway 102 is coupled to international LSAP 44 on line 103. International CPE 104 is coupled to LSAP 44 on line 105. LSAPs 14, 22 and 44 have access to the Internet on connections, 55, 59 and 57. Gateways 66, 68, and 102 are well known in the art and are defined herein as systems that provide translation of protocols for call setup and release, conversion of media formats between different networks, and transferring of information between networks connected by the gateway such as LSAP 14, LSAP 22, and LSAP 44. The gateways 66 and 68 used in the present invention operate with the well-known Voice-over-IP standards that are cornerstone technology for the transmission of real-time audio, video, and data communications over packet-based networks. VoIP is defined as a standard that specifies the components, protocols, and procedures providing multimedia communication over packet-based networks. Because these gateways meet the VoIP standards, no further discussion will be provided regarding them.

The system operates as follows. The Calling Party or Web browser 12 goes off-hook through his PC 18 using LSAP 14.

A dial tone is received from the LSAP 14 and the Web browser 12, or Calling Party, enters the ISP access digits and is given access to the Internet network 54 through ISP access 52. The Web browser then searches the Internet for desired information stored on servers 56 and 58 (two of N servers) that contain the Web Pages for the business customer. The Web Page user (Calling Party) then may browse the Web Pages in search of the information desired. Depending on the business type, a Web Page may ask for specific information regarding the Web Page user (CPE 12) and or for more detail regarding the information requested. This information will be presented later to the advertiser agent for faster and more convenient service. This information may relate to product/service options such as color, size, special pricing, fares, credit card security, perceptions, credit card information, product questions and comparisons and the like. The basics of this new art are to allow the Web Page user at this stage to have a quality voice conversation with the business agent about the service requested. This is accomplished by providing a "call me" capability located on the Web Page. Calling Party or Web Page user profile information (such as what number to be called back) is gathered from the Calling Party the first time the "call me" capability is activated. This is accomplished by a "pop-up window" displayed on PC 18 when the "call me" capability is activated on the Web Page. When the "call me" capability is activated by the use of a mouse control and a click on the Web Page call me "button", the information required to place the call (such as calling and called number) is forwarded to the Call Control Server (CCS) 70 in MVoIP 64 using connection 76. Future use of the "call me" capability will not require the Web Page user to fill out the user profile information. This information will be stored on the Web Page user PC 18 and Call Control Server 70 for future use.

The Call Control Server (CCS) 70 receives information sufficient to place a call to the Called Party CPE (CC) 20 on line 74 and local switch access 78 and the Calling Party Web user 16,18 at CPE 12 on line 72 and local switch access 82. This call is placed using connection 80 to Called Party LSAP 22 from gateway 68 and connection 84 from gateway 66 to Calling Party LSAP 14. Notice that these are local access lines and are free from toll call regulations making this invention less expensive to the business customer. The call from the CCS 70 will be placed first to the CPE 20 and, after an answer is received, the call will also be placed by the CCS 70 to the CPE 12 Calling Party.

Another very important part of this new art is the capability of queuing calls in "cyber space" if agents are all busy and can not receive any further call. This is accomplished by CCS 70 (in VoIP network 64) receiving information regarding agent (Called Party) status from CPE (CC) 20 through IP data connections 86 and 59. If agents (Called Party) are not available the call will be held in queue by CCS 70 until such time and agents are available. The Calling Party will be given options if the call is to be held in queue for a length of time. These options include a "pop-up window" on CPE 12 PC 18 indicating the estimated length of time for the call to held in queue and the options of being called back, and when the callback should occur, i.e. immediately, in one hour, etc. If the Calling Party CPE 12 has only a single line that is also used by the PC 18 for communication, a "pop-up window" will be displayed informing the Calling Party to hang up from the Internet connection in order to receive the callback from the agent (Called Party) on telephone 16.

If the Web Page user (Calling Party) has two telephone lines connected to LSAP 14, then the Web Page user can remain connected to the Internet on PC 18 while communicating to the business agent through telephone 16. Thus, both an audio and IP data dialog may take place between the Calling Person 12 and the Called Party 20, if the Calling Person has two telephone lines.

It will be seen, then, that the MVoIP network provides reliable carrier-grade voice quality service over connections established between the parties using the Internet. The MVoIP network provides VoIP gateway functions between the LSAPs and the IP networks. As stated earlier, functions of the gateways in the MVoIP include translating IP and PSTN addresses, covering network interface bridge protocol and the like.

The Call Control servers 70, in the MVoIP 64 may perform and support a range of services including calls set up to service Call Center agents whose telephone lines are idle, callback queuing, automated attendant directory navigation and routing procedures, call arrival and queue status, service features and access based on customer profile data, callback queue and setup, secondary Web Pages and the like. All of these services provide cost saving and increased revenue to the business customer while providing a service to the Web Page user.

The Call Control servers 70 also establish the call to the service Call Center 20 (Called Party) and have a dialogue with the automatic attendant directory menus. It uses navigation procedures and Calling Party profile data to complete directory menu responses for the service type needed. It may also select the attendant and initiates the user callback, as directed, to the original Calling Party. It completes the callback to the originating Calling Party through the MVoIP network and the Calling Party LSAP. As stated earlier, the cost-per-minute or usage billing may be started when the call is connected to an agent and end when the Calling Party or Called Party hangs up.

In another use of the novel MVoIP telephone system the telephone white pages may be stored in the Web server 58. In this case the Web Page user (Calling Party) CPE 12 is browsing the Internet for phone number information. When the white page or yellow page information is located, the user can simply click on the name of the person to be contacted and the call information will be forwarded to CCS 70. The CCS will then place a call to the appropriate gateway of the Calling Party and the Called number. The LSAP will then route a local call to the proper number. This white or yellow page directory could also include international phone number and connections would then be made though gateways associated with the international location.

Another novel use of this invention is the calling from a received e-mail. When an e-mail is received by a first party who wishes to have a telephone conversation with the person sending the e-mail, the first party becomes the Calling Party by selecting the name of the e-mail sender with a PC cursor (mouse) and "clicking" on the name. The selection will send the Calling and Called information to the CCS which will place a call to each party though MVoIP network as discussed earlier.

Thus the MVoIP network has a non-regulated cost structure, has reliable carrier-grade, voice quality connections, has VoIP connections for customer interaction with service Call Centers, makes data collaboration available between business and buyer/user and provides navigational procedures for direct routing through an automatic attendant directory to proper Call Center agents or departments. This system eliminates charges and customer annoying hold times trying to navigate through directory menus and voice prompts. It eliminates the necessity for customer queuing at Call Centers and reduces Call Center work force requirements by delivery of an informed buyer to the agent. It also provides ubiquitous user access to Web based business for voice and data collaboration.

Figure 4A:
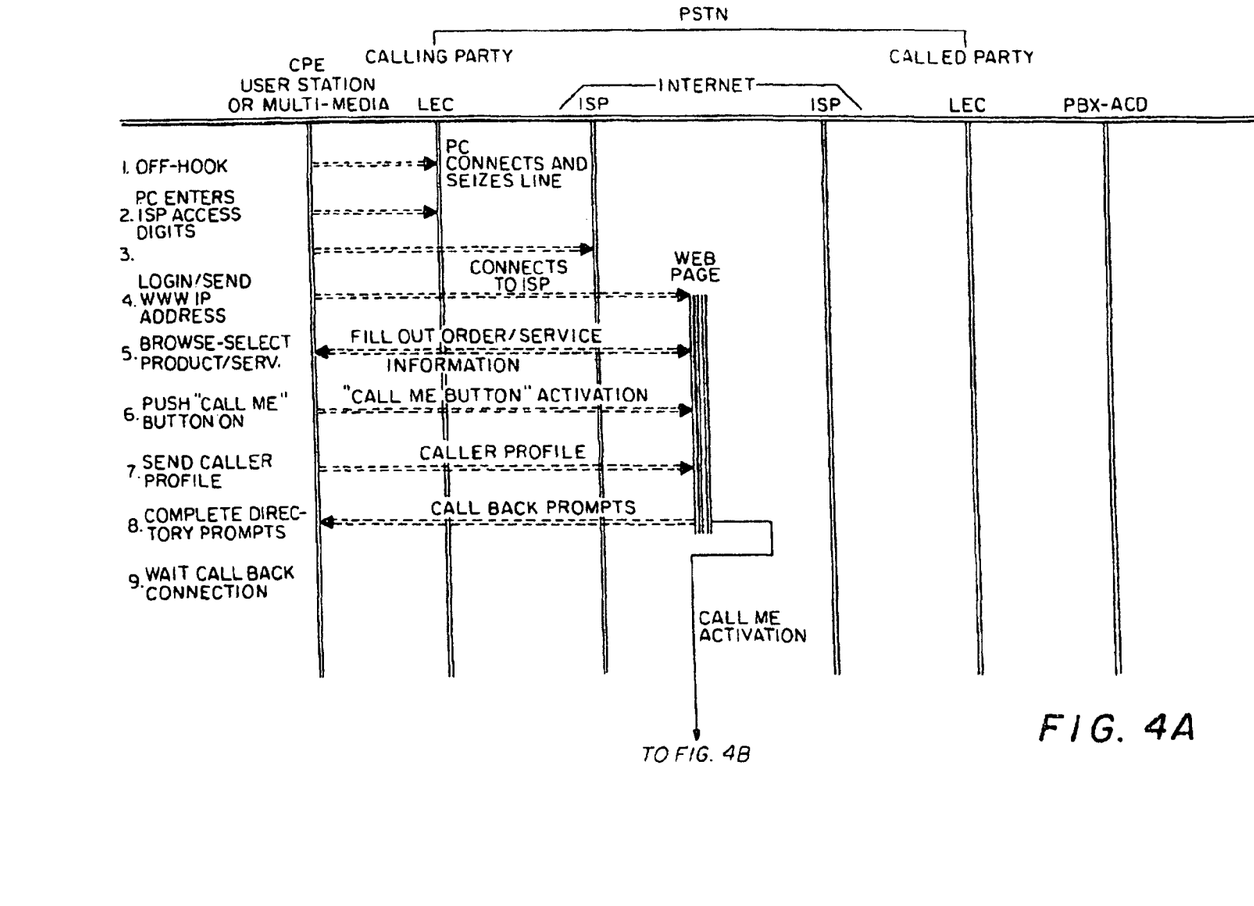
FIG. 4A and FIG. 4B together form a flow chart illustrating the novel steps of the present invention.
Figure 4B:
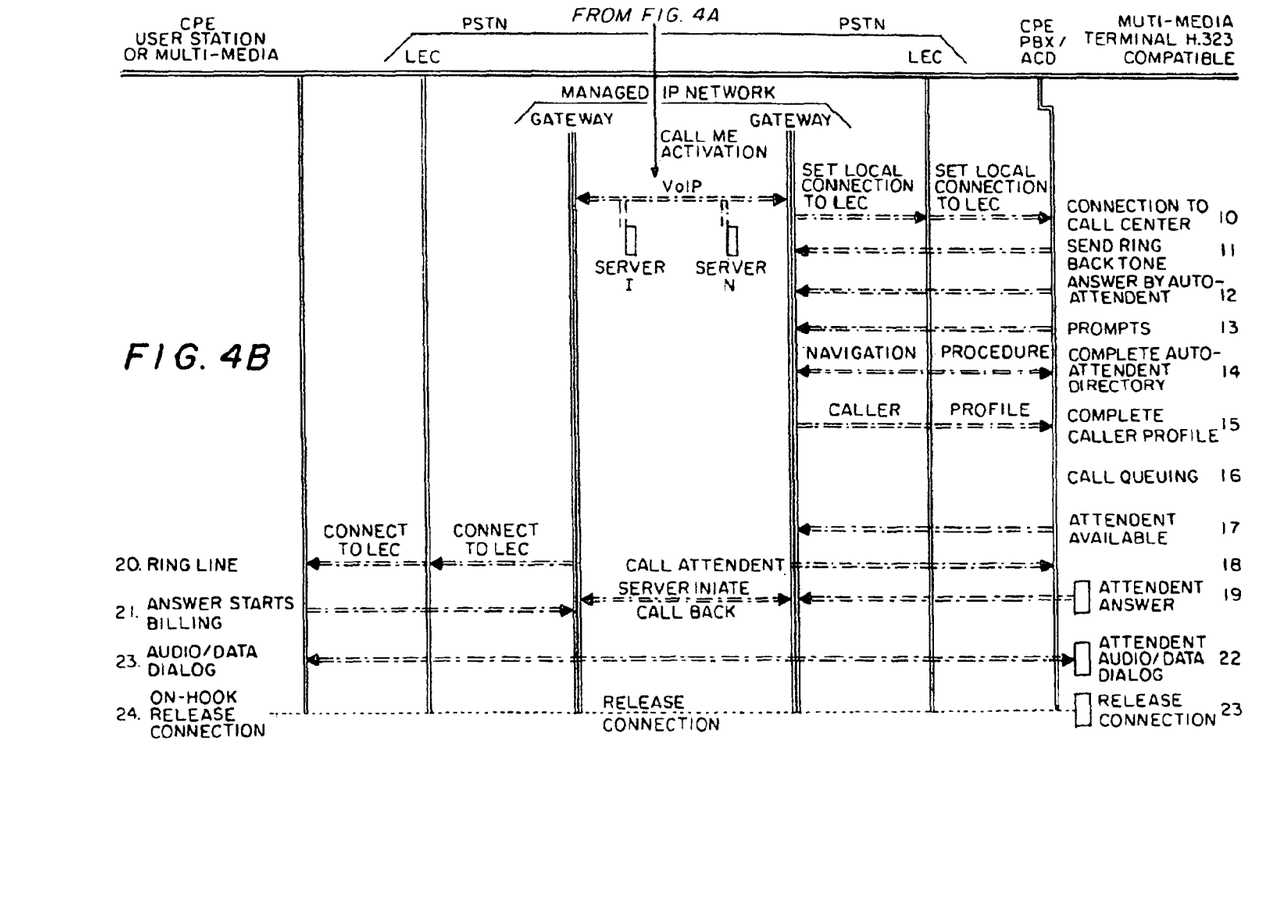

A flow chart illustrating the relationship of the system elements and the novel steps of the present invention is shown in FIG. 4A and FIG. 4B. This flow chart shows the typical Internet connection to browse a Web Page to view products/services, then using a Web server "call me" button to establish a VoIP connection over a reliable voice quality MVoIP network to the CPE Call Center (Called Party) or a single phone, then connect to the original single or multi-line telephone Internet user/Calling Person. It can be seen at the top of FIG. 4A that the PSTN is used in the normal fashion to connect a Call mg Party LSAP to a Called Party LSAP. Further, it can be seen at the top of FIG. 4A that the Internet can be used to connect a Calling Person to a Called Party through an Internet Service Provider (ISP). This connection for voice communication is very unreliable and very poor quality. This service is available "for free" and is not being used for business application where quality and reliable service is required. Further, this service is not ubiquitous to all Web Page users.

Thus the novel invention includes a Managed Voice-over-Internet Protocol network (MVoIP), shown at the top of FIG. 4B that includes the VoIP gateway and the Call Control servers. The MVoIP network is used in conjunction with the Internet to bypass the PSIN as shown.

Thus, in FIG. 4A, at step 1, the Calling Party goes off-hook and the PC connects to and seizes the telephone line through the Calling Party LSAP. At step 2, the Calling Party uses his PC to enter the ISP access digits which then, at step 3, connects the Calling Party PC to the ISP forming part of the Internet. At step 4, the Calling Party "logs-in" and sends the www.IP address of the business customer or party of interest and thus connects to the proper Internet Web Page. At step 5, the Calling Party browses the Web Pages until a product/service of interest is found on a selected Web Page. He then selects that product/service and may at this point complete a Calling Party profile. Depending on the business, this information may include airline schedule information, color of desired product, credit card number, account number etc. This information will be helpful to the business agent when the Web Page user places a voice call to the business. At step 6, the Calling Person activates a "call me" button on the selected Web Page with his PC mouse. At step 7, he sends the Calling Party profile that details the product/service wanted such as color, size, cost, fares, and the like. At step 8, the MVoIP may send back prompts (window pop-up) to the Calling Party depending upon the status of the telephone lines of the Called Party or advertiser business agent. Such prompts may indicate that all lines are busy so a message is given such as "hang up and you will be called back in 5 minutes". If such is the case, the Calling Person waits for the call at step 9.

At step 10, at the top of page 4B, the Internet is shown connecting to the VoIP of the MVoIP network through the gateways. The Call Control Servers, 1-N, of the MVoIP sets the local connections to the LSAP of the Called Party and to the LSAP of the Calling Party. At step 11, the CPE sends back to the Call Servers in the MVoIP network a conventional ring tone and, at step 12, an auto-attendant answers. At step 13, the CPE provides the conventional prompts to the Call Control Servers. At step 14, the CCS automatically navigates the prompts to connect the proper agents based on the profile information received. At step 15, the Calling Party profile is sent to and stored at the Call Center for use by an agent in communicating with the Calling Party by voice and/or IP data.

If no agents are available, the call is placed in a queue at step 16 to await the next available agent. When an agent becomes available, the off-hook notice is given at step 17 and a communication link is established between the agent and the CCS at step 18. At step 19, the CCS initiates a "callback" to the Calling Person and a "ring" connection is made to the Calling Party through the LSAP and the CPE of the Calling Person at step 20.

At step 21, the Calling Person begins the telephone dialogue with the agent of the Called Party. It is at this time that the billing for the call is started. At step 22, a conversation is held by the Calling Person and the agent of the Called Party. When the transaction is completed at step 23, the phone connections are released and placed on-hook by both the Calling Party and the Called Party The corresponding structures, materials, acts, and equivalents of all means or step plus function elements in the claims below are intended to include any structure, material, or act for performing the function in combination with other claimed elements as specifically claimed.

The invention claimed is:

1. A method for enabling voice communication between parties, the method comprising:
providing a selection object for enabling a first party, having first customer premises equipment, to request a voice communication connection with a second party, having second customer premises equipment, wherein the object is based on information from a server on an internet;
receiving the request for a voice communication connection between the first and second parties in response to the first party selecting the object; and
requesting activation of the voice communication connection between the first and second parties, wherein activation includes requesting establishment of the voice communication connection, wherein the voice communication connection is automatically activated in response to the first party selecting the object, wherein the voice communication is carried over a managed Voice Over Internet Protocol (VoIP) connection that provides Public Switching Telephone Network (PSTN) voice quality, and wherein the managed VoIP connection is separate and distinct from the internet.

2. The method of claim 1, wherein the object is provided on a web page.

3. The method of claim 1, wherein the object is provided in an email message.

4. The method of claim 1, wherein the second party is an advertiser, and wherein the object is associated with the advertiser.

5. The method of claim 1, wherein the object includes a name, number symbol or button.

6. The method of claim 1, wherein requesting activation of the voice communication connection comprises forwarding information required to establish the voice communication connection.

7. The method of claim 6, wherein forwarding information required to establish the voice communication connection comprises forwarding at least one IP address.

8. The method of claim 6, wherein forwarding information required to establish the voice communication connection comprises forwarding a calling number associated with the first party and a called number associated with the second party.

9. The method of claim 1, wherein the entire voice communication between the first party and the second party is a managed VoIP connection.

10. The method of claim 1 where receiving the request for the voice communication connection is received over a network connection.

11. The method of claim 10, wherein receiving the request for the voice communication connection is received by a server.

12. The method of claim 1 further comprising receiving information associated with the first party.

13. The method of claim 12, wherein the received information associated with the first party includes first party profile information.

14. The method of claim 1 further comprising forwarding information associated with the first party.

15. The method of claim 14, wherein the forwarded information associated with the first party includes first party profile information.

16. The method of claim 14, wherein forwarding comprises forwarding the information associated with the first party to the second party.

17. The method of claim 1 further comprising determining the second party based on information associated with the first party.

18. The method of claim 17 wherein the information associated with the first party includes information retrieved from storage.

19. The method of claim 1 further comprising automatically navigating an auto-attendant directory associated with the second party.

20. The method of claim 1 wherein the first party is held in queue.

21. The method of claim 20, wherein the first party is held in queue until the second party is available.

22. The method of claim 20, wherein an availability status of the second party is determined, and wherein the availability status of the second party is sent to the first party.

23. The method of claim 20, wherein the amount of time the first party will be held in queue is estimated and wherein the estimated time is sent to the first party.

24. The method of claim 20, wherein the amount of time the first party will be held in queue is determined by the first party.

25. The method of claim 1, wherein the server is on an internet browsed by the first party.

26. A method for enabling voice communication between parties, the method comprising:
providing a selection object for enabling a first party, having first customer premises equipment, to request a voice communication connection with a second party, having second customer premises equipment, wherein the object is based on information from a server on an internet:
receiving the request for a voice communication connection between the first and second parties in response to the first party selecting the object: and
requesting activation of the voice communication connection between the first and second parties, wherein the request for activation of the voice communication connection is carried over a managed Voice Over Internet Protocol (VoIP) connection that provides Public Switching Telephone Network (PSTN) voice quality, wherein activation includes requesting establishment of the voice communication connection, wherein the voice communication connection is automatically activated in response to the first party request for a voice communication connection, and wherein the managed VoIP connection is separate and distinct from the internet.

27. The method of claim 26, wherein the voice communication is carried over a managed VoIP connection between the first and second parties.

28. The method of claim 27, wherein the entire voice communication between the first party and the second party is a managed VoIP connection.

29. The method of claim 26 wherein the object is provided on a web page.

30. The method of claim 26, wherein the information is provided in an email message.

31. The method of claim 26, wherein the second party is an advertiser, and wherein the object is associated with the advertiser.

32. The method of claim 26, wherein the object includes a name, number, symbol or button.

33. The method of claim 26, wherein requesting activation of the voice communication connection comprises forwarding information required to establish the voice communication connection.

34. The method of claim 33, wherein forwarding information required to establish the voice communication connection comprises forwarding a calling number associated with the first party and a called number associated with the second party.

35. The method of claim 26 further comprising receiving the first party selection.

36. The method of claim 35, wherein receiving the request for the voice communication connection is received over a network connection.

37. The method of claim 36, wherein receiving the request for the voice communication connection is received by a server.

38. The method of claim 26 further comprising receiving information associated with the first party.

39. The method of claim 38, wherein the received information associated with the first party includes first party profile information.

40. The method of claim 26 further comprising forwarding information associated with the first party.

41. The method of claim 40, wherein the forwarded information associated with the first party includes first party profile information.

42. The method of claim 40, wherein forwarding information associated with the first party comprises forwarding the information to the second party.

43. The method of claim 26 further comprising determining the second party based on information associated with the first party.

44. The method of claim 43, wherein the information associated with the first party includes information retrieved from storage.

45. The method of claim 26 further comprising automatically navigating an auto-attendant directory associated with the second party.

46. The method of claim 26, wherein the first party is held in queue.

47. The method of claim 46, wherein the first party is held in queue until the second party is available.

48. The method of claim 46, wherein an availability status of the second party is determined and wherein the availability status of the second party is sent to the first party.

49. The method of claim 46, wherein the amount of time the first party will be held in queue is estimated and wherein the estimated time is sent to the first party.

50. The method of claim 46, wherein the amount of time the first party will be held in queue is determined by the first party.

51. The method of claim 26, wherein the server is on an internet browsed by the first party.

52. The method of claim 51, further comprising:
providing a web browser for enabling the user of the customer premises equipment to browse the information originated from the internet.

53. A method of enabling voice communication by customer premises equipment, comprising:
receiving, by the customer premises equipment, information originated from an internet;
providing, on the customer premises equipment, a selection object for enabling a user of the customer premises equipment to request a voice communication with another party, wherein the selection object is based on the information originated from the internet;
receiving, by the customer premises equipment, a user selection of the selection object; and
activating, by the customer premises equipment, the voice communication that is carried over a managed Voice Over Internet Protocol (VoIP) connection in response to the user selection of the selection object, wherein the managed Voice Over Internet Protocol (VoIP) connection is separate and distinct from the internet, and wherein Public Switching Telephone Network (PSTN) voice quality is provided over the managed Voice Over Internet Protocol (VoIP) connection.

54. The method of claim 53, wherein the information is originated from a server on the internet.

55. The method of claim 53, wherein the information originated from the internet includes web page information received by the customer premises equipment.

56. The method of claim 53, wherein the information originated from the internet includes email information received by the customer premises equipment.

57. The method of claim 53, wherein the selection object includes a name, number, symbol or button.

58. The method of claim 53, wherein activating the voice communication that is carried over a managed Voice Over Internet Protocol (VoIP) connection includes transmitting, by the customer premises equipment, a request to establish the voice communication with the another party, whereby the customer premises equipment is connected to the another party over the managed Voice Over Internet Protocol (VoIP) connection as a result of the customer premises equipment transmitting the request to establish the voice communication.

59. The method of claim 58, wherein the request to establish the voice communication is transmitted over a network connection.

60. The method of claim 53, wherein activating the voice communication that is carried over a managed Voice Over Internet Protocol (VoIP) connection includes forwarding, by the customer premises equipment, information required to establish the voice communication connection.

61. The method of claim 60, wherein forwarding information required to establish the voice communication connection includes forwarding, by the customer premises equipment, at least one IP address.

62. The method of claim 60, wherein forwarding information required to establish the voice communication connection includes forwarding, by the customer premises equipment, a calling number associated with the customer premises equipment.

63. The method of claim 60, wherein forwarding information required to establish the voice communication connection includes forwarding, by the customer premises equipment, a calling number associated with the another party 64. The method of claim 53, wherein the customer premises equipment includes a telephone, personal computer, multimedia PC, multimedia cable television, cellular phone or call center equipment.

65. The method of claim 64, wherein at least a portion of the voice communication is carried over a wireless network.

66. The method of claim 53, wherein the entire voice communication is a managed Voice Over Internet Protocol (VoIP) connection.

67. The method of claim 53, further comprising forwarding, by the customer premises equipment, information associated with the user of the customer premises equipment.

68. The method of claim 67, wherein the forwarded information associated with the user includes user profile information.

69. The method of claim 67, wherein the forwarded information associated with the user includes information retrieved from storage on the customer premises equipment.

* * * * *

UNITED STATES PATENT AND TRADEMARK OFFICE
CERTIFICATE OF CORRECTION

| | | |
|---|---|---|
| PATENT NO. | : 8,537,812 B2 | Page 1 of 1 |
| APPLICATION NO. | : 13/411388 | |
| DATED | : September 17, 2013 | |
| INVENTOR(S) | : Rex Hester | |

It is certified that error appears in the above-identified patent and that said Letters Patent is hereby corrected as shown below:

In the Claims:

Column 14, Line 52, Claim 5, after "number" insert -- , --

Column 15, Line 38, Claim 23, after "estimated" insert -- , --

Column 16, Line 60, Claim 48, after "determined" insert -- , --

Column 16, Line 63, Claim 49, after "estimated" insert -- , --

Column 18, Line 24, Claim 63, after "party" insert -- , --

Signed and Sealed this
Eighteenth Day of February, 2014

Michelle K. Lee
*Deputy Director of the United States Patent and Trademark Office*